T. E. MURRAY.
PIPE COUPLING AND METHOD OF PRODUCING THE SAME.
APPLICATION FILED MAR. 28, 1918.
1,293,871.
Patented Feb. 11, 1919.
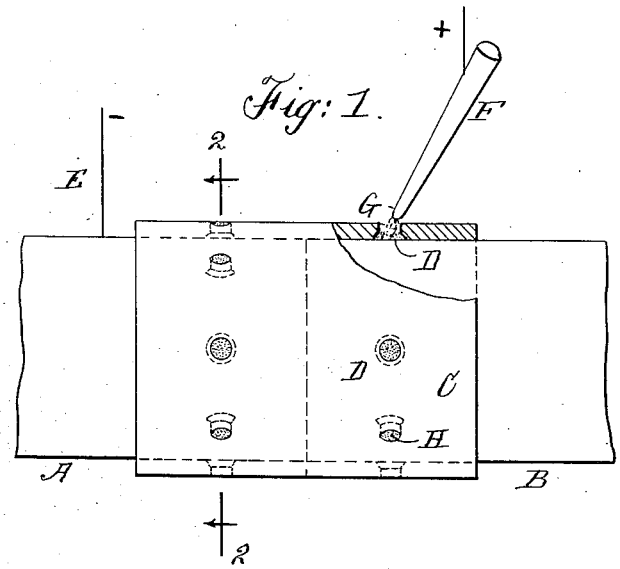
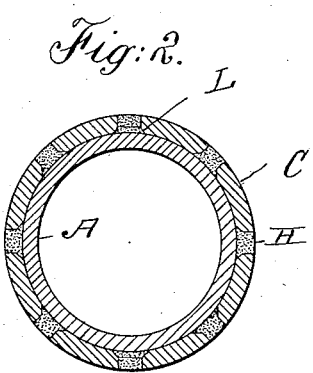
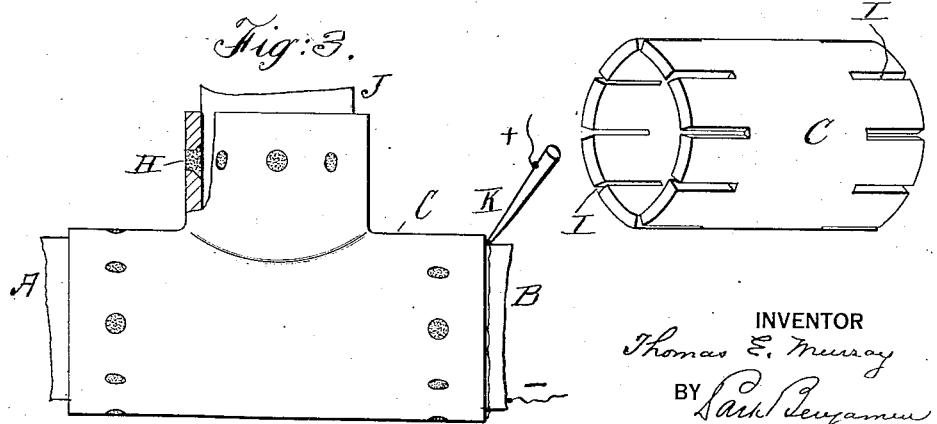
INVENTOR
Thomas E. Murray
BY Park Benjamin
his ATTORNEY

UNITED STATES PATENT OFFICE.

THOMAS E. MURRAY, OF NEW YORK, N. Y.

PIPE-COUPLING AND METHOD OF PRODUCING THE SAME.

1,293,871.    Specification of Letters Patent.    Patented Feb. 11, 1919.

Application filed March 28, 1918. Serial No. 225,156.

*To all whom it may concern:*

Be it known that I, THOMAS E. MURRAY, a citizen of the United States, residing at New York, in the county of New York and State of New York, have invented a certain new and useful Improvement in Pipe-Couplings and Methods of Producing the Same, of which the following is a specification.

The invention is a pipe coupling and method of producing the same. The end portions of the pipes are placed in a coupling sleeve having openings in its wall. Projections on said pipe surfaces are then formed, entering said openings, by which projections said pipes become locked in said sleeve. In order to seal the joints at the ends of the sleeve, the sleeve extremities may be electrically welded to the pipe surfaces.

In the accompanying drawings—

Figure 1 is an elevation of my coupling, a portion of the sleeve being broken away to show the metal terminal which supplies the fused metal to produce the projections on the pipes which enter the sleeve openings. Fig. 2 is a section on the line 2, 2 of Fig. 1. Fig. 3 is an elevation of a T coupling for uniting three pipes, a portion being broken away to show one of the sleeve openings filled with fused metal. Fig. 4 is a modified form of sleeve, in which the openings are slots in the ends of said sleeve.

Similar letters of reference indicate like parts.

A and B are two pipes having their end portions entering the sleeve C, and preferably abutting. In the sleeve C are a number of openings D, disposed preferably circumferentially around the sleeve. When the sleeve is in place, the outer surfaces of both pipes are exposed at said openings. One terminal E of a circuit is connected to one of the pipes—here pipe A. The other terminal is connected to a metal rod F, the end G of which is preferably tapered so that it may be approximated with sufficient nearness to the exposed pipe surface at each of the sleeve openings to cause, when the current is established, an electric arc between the said extremity G and the exposed pipe surface. By reason of the formation of this arc, the metal of rod F is fused and projected from said extremity G upon said pipe surface, thus forming a projection upon said surface which is united thereto, and which enters and preferably fills the sleeve opening, as shown at H. By reason of these projections made at and entering the several openings, the pipes A, B become permanently locked in the sleeve C.

In the case of a T coupling, as shown in Fig. 3, the openings are made in each of the three branches of the sleeve C, so that each of the three pipes A, B, J entering said sleeve is locked therein in the manner described. Instead of making the openings in the body of the sleeve between the ends, as shown in Figs. 1, 2 and 3, I may make them in the form of slots I in the ends of the sleeve, as shown in Fig. 4, and produce the locking projections on the pipes in these slots in the way already set forth.

In order to increase the area of the projections at the surface of the pipes, I preferably make the openings in the sleeve wall flared, or of greater cross sectional area at their inner ends than at their outer ends, as shown at L.

When the pipes are used as ducts or conduits for electric conductors, or the like, it is sufficient to lock them in the sleeve in the manner described, but when they are used to convey fluid under pressure, then it is desirable to seal the joints between the extremities of the sleeve and the pipe surfaces, so as to guard against any possible leakage. This I do by homogeneously uniting the metal of the sleeve at said extremities to the metal of the pipes. Preferably, I employ electric welding for this purpose, as shown in Fig. 3. One terminal of the welding circuit is connected, as before, to the pipes A, B, and the other is a rod K which the operator presses into the joint between the edge of the sleeve C and the pipe while moving said rod progressively circumferentially around the joint, thus fusing the metal which enters and hermetically seals said joint. Where the modified form of sleeve openings shown in Fig. 4 is used, this sealing of the end joints at the same time fuses and distributes any metal which, after the integral projections are produced in the slots I, may be extruded at the open ends of said slots, thus smoothing and finishing the joint, besides sealing the same.

In another application for Letters Patent Serial No. 225,159 filed simultaneously here-with, I have described and claimed the method of uniting the sleeve extremity to the pipe, hereinbefore set forth.

I claim:

1. The method of coupling pipes, which consists in disposing the end portions of said pipes in an integral tubular coupling sleeve having openings in its wall, and then producing upon the peripheries of said pipes and without indenting the same projections entering said openings.

2. The method of coupling pipes, which consists in disposing the end portions of said pipes in an integral tubular coupling sleeve having openings in its wall, and then electrically producing upon the peripheries of said pipes and without indenting the same projections entering said openings.

3. The method of coupling pipes, which consists in disposing the end portions of said pipes in an integral tubular coupling sleeve having openings in its wall, the said pipes being connected in circuit with a metal rod, and holding the end of said rod in proximity to each of said openings in turn, whereby an arc is established from the rod extremity to the pipe surfaces respectively exposed at said openings, and the fused rod metal is projected into said openings and caused to form projections on said pipes entering said openings.

4. A pipe coupling, comprising an integral tubular sleeve receiving in its opposite ends the pipes to be coupled and having openings in its wall, means entering said openings for locking said pipes in said sleeve, and a body of electrically deposited metal filling the angles between the faces of the ends of said sleeve and the adjacent surfaces of said pipes.

In testimony whereof I have affixed my signature in presence of two witnesses.

THOMAS E. MURRAY.

Witnesses:
GERTRUDE T. PORTER,
MAY T. McGARRY.